United States Patent Office 3,242,020
Patented Mar. 22, 1966

3,242,020
GELLED ALCOHOL EXPLOSIVE COMPOSITION
Bobby L. Atkins, Lake Jackson, and Robert N. Bashaw, Freeport, Tex., assignors to The Dow Chemical Company, Midland, Mich., a corporation of Delaware
No Drawing. Filed Sept. 27, 1963, Ser. No. 312,003
6 Claims. (Cl. 149—19)

The invention is a new gelled composition of matter.

Many reactive materials of a chemical nature which are highly desirable for use to attain specific objectives exist normally as liquid, and in such state, are often difficult or impossible to employ.

In such circumstances, attempts to convert the liquid to a solid or semi-solid state are often made. A particularly desirable state is that of a gel which can be pumped and displaced by pressure but is readily deformable, taking the shape of walls confining it.

One recourse is to gel the liquid or mixture of liquids. Satisfactory gelling agents to be used with given liquids for specific uses are known. However, various chemical compositions usually require different materials for the gelation thereof and it is difficult to predict the satisfactory gelation of a liquid on the basis of a specific material having been known to effectuate gelation in other types of liquids. Furthermore, even though a gelling agent may effect gelation of a given liquid, its presence is often undesirable because it interferes with the intended use of the gelled material. Among liquids which are often desired to be employed in a solid or semi-solid state are combustible materials. A fully satisfactory gelling agent for a number of combustible materials has not yet been found.

Accordingly, a need exists for an improved gelling agent, and gelled composition resulting from the use of such agent, for gelling certain types of combustible materials.

We have discovered that the polymer, cross-linked poly-(N-vinyl-2-pyrrolidone), when admixed with mono-, di-, or higher polyalcohols (to which we may refer as hydroxy compounds) provides a gelled composition having unique properties which render it particularly adaptable for a number of uses, especially for preparing combustible materials.

The invention encompasses a composition of matter comprising (1) an hydroxy compound selected from the class consisting of mono-, di-, and higher polyalcohols, containing a total of between 1 and about 10 carbon atoms per molecule, mono-alkyl ethers wherein the alkyl group contains 1 to 2 carbon atoms, and polyalkylene glycols wherein each alkylene group contains from 2 to 3 carbon atoms and the glycol has a molecular weight of not greater than about 1000, and (2) cross-linked poly-(N-vinyl-2-pyrrolidone) in an amount sufficient to provide between about 0.2 and 10.0 percent by weight of the polymer based on the weight of the hydroxy compound employed. The mono-alcohol may be either saturated or unsaturated. The di-alcohols may be any glycol of the formula

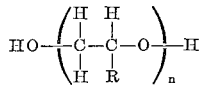

wherein $n$ is an integer of 1 to 5 and R is hydrogen or a methyl group. Illustrative of a higher alcohol is glycerol.

A particular advantage of the invention is that the alcohol employed may be anhydrous in contrast to the requirement that only an aqueous solution of an alcohol can be gelled by known techniques involving the use of a polymer. Another advantage of the invention is that solids may be suspended in the gelled compositions. The composition of the invention offers the further advantage of being operable at extremely low temperatures. The resulting gel is a readily deformable fuel which may be forced by air, pumped, or otherwise displaced into spaces and voids where it is desired that it be used. The invention also encompasses an explosive composition comprising the gelled composition above admixed with an explosive, e.g., an alkali-metal nitrate, ammonium nitrate, or mixtures thereof, and particularly such nitrates admixed with flaked or granular aluminum or magnesium metal. An important use of such gelled compositions, accordingly, is in the preparation of rocket fuels and explosives.

The polymer employed is that prepared by polymerizing monomeric N-vinyl-2-pyrrolidone, either by the aid of a cross-linking agent or by subjecting the monomer to irradiation. Usually the monomer is polymerized in a 10 to 60 percent by weight aqueous solution to which is admixed a cross-linking agent, e.g., one of N,N'-methylenebisacrylamide, divinyl ether of diethylene glycol, divinylbenzene, sulfonated divinylbenzene and sodium salts of sulfonated divinylbenzene, in an amount sufficient to provide between about 0.02 percent and about 2.5 percent based on the weight of the monomer; or the N-vinyl-2-pyrrolidone may be subjected to irradiation to effectuate polymerization, e.g., gamma rays or electron bombardment. When polymerization is brought about by a cross-linking agent, a free-radical catalyst is present, e.g., $\alpha,\alpha'$-azobisisobutyronitrile, benzoyl peroxide, hydrogen peroxide, or ammonium or potassium persulfate together with ammonium or potassium bisulfite.

EXAMPLES 1 TO 14

Illustrative of the polymer prepared by use of a cross-linking agent and catalyst, suitable for use in the practice of the invention, is that made according to the following procedure:

100 grams of N-vinyl-2-pyrrolidone, 1.0 gram of divinylbenzene, and 0.3 gram of azobisisobutyronitrile are admixed with an aqueous solution, and reacted at between room temperature and reflux temperature for about 0.5 to 2.0 hours and separating the polymerized N-vinyl-2-pyrrolidone formed thereby. The presence of an inorganic salt in the aqueous solution, e.g., $MgSO_4$, has been found to accelerate the rate of polymerization.

Among the hydroxy compounds useful in the practice of the invention are: methanol, ethanol, isopropanol, 2-ethylhexanol, ethylene glycol, propylene glycol, diethyl glycol, dipropylene glycol, polyethylene glycols, polypropylene glycols, diethylene glycol monoethyl ether, diethylene glycol monomethyl ether, ethylene glycol monoethyl ether, propylene glycol monomethyl ether, furfuryl alcohol, and triethanolamine.

The following examples were performed to illustrate the practice of the invention:

To portions of N-vinyl-2-pyrrolidone in a 20 percent by weight equeous solution, there were admixed $\alpha,\alpha'$-azobisisobutyronitrile as a free-radical promoting catalyst, and, successively, the cross-linking agent, in the percent by weight based on the weight of the N-vinyl-2-pyrrolidone, set out in Table I below. The polymerized N-vinyl-2-pyrrolidone so made was then admixed with isopropyl alcohol in the percent by weight, based on the weight of the alcohol shown in Table I, to form the gelled composition of the invention. The efficacy of the cross-linked polymer to gel the alcohol to produce the gelled fuel of the invention is designated "gel capacity." By the term "gel capacity" is meant the grams of liquid completely imbibed by 1 gram of polymer. It is the reciprocal of the percent by weight in grams of liquid which is gelled by a given weight of polymer multiplied by 100, i.e., $$\frac{l}{\text{percent gelled polymer}} \times 100 = \text{gel capacity in grams}$$

For practical purposes, a gelling agent should have a gel capacity of at least about 10 or 15 so that the amount of gelling agent employed is not great.

| Example No. | Cross-Linking Agent Used, in Percent by Weight of N-vinyl-2-pyrrolidone, | Percent by Weight of Cross-Linked N-vinyl-2-pyrrolidone polymer based on Weight of Alcohol | Gel Capacity of the Cross-Linked Polymer to Gel Isopropyl alcohol |
|---|---|---|---|
| 1 | 0.3% N,N'-MBA([1]) | 2.00 | 50 |
| 2 | 0.5% N,N'-MBA([1]) | 4.38 | 22.8 |
| 3 | 0.7% N,N'-MBA([1]) | 4.10 | 24.4 |
| 4 | 1.0% N,N'-MBA([1]) | 4.00 | 25.2 |
| 5 | 1.2% N,N'-MBA([1]) | 4.78 | 20.9 |
| 6 | 0.3% divinyletherglycol([2]) | 3.10 | 32.2 |
| 7 | 0.5% divinyletherglycol([2]) | 3.45 | 29.0 |
| 8 | 0.7% divinyletherglycol([2]) | 3.10 | 32.2 |
| 9 | 1.0% divinyletherglycol([2]) | 3.47 | 28.8 |
| 10 | 1.5% divinyletherglycol([2]) | 3.66 | 27.3 |
| 11 | 0.3% divinylbenzene | 4.00 | 25.0 |
| 12 | 0.5% divinylbenzene | 3.18 | 31.4 |
| 13 | 1.2% divinylbenzene | 4.24 | 22.6 |
| 14 | 1.0% diacrylate([3]) | 3.36 | 29.8 |

([1]) is N,N'-methylenebisacrylamide.
([2]) is divinylether of diethyleneglycol.
([3]) is diacrylate of polyethyleneglycol having an average molecular weight of about 600.

Reference to the gel capacity values of Table I show that when the cross-linked poly-(N-vinyl-2-pyrrolidone) is employed with a typical mono-alcohol, that a good gelled composition results. It also shows that the amount of the polymer, employed in accordance with the invention, may be relatively small, since a gel capacity of 50 grams was attained with the polymer employed. It is apparent that not more than about 2.0 percent by weight of the polymer would be required. Over about 10 percent by weight of the polymer would appear unnecessary.

EXAMPLE 15

The following examples were run wherein the polymer, resulting from polymerizing in a 20 percent aqueous solution of N-vinyl-2-pyrrolidone with 0.5 percent by weight of divinyl ether of diethylene glycol, was used in the amount of 2 percent by weight, of the alcohol employed, to gel the following acohols: methanol, ethanol, 2-ethylhexanol, ethylene glycol, propylene glycol, diethylene glycol, tripropylene glycol, polyethylene glycol of a molecular weight of about 200, polypropylene glycol of a molecular weight of about 400, diethylene glycol monomethyl ether, diethylene glycol monoethyl ether, ethylene glycol monomethyl ether, propylene glycol monoethyl ether, furfuryl alcohol, and triethanolamine. Each of the alcohols gelled satisfactorily.

EXAMPLE 16

N-vinyl-2-pyrrolidone was polymerized by subjecting a 50 percent by weight aqueous solution thereof to gamma ray irradiation at a dose rate of between 0.16 and 0.32 megarad per hour. The resulting polymer was admixed with isopropyl alcohol, tripropylene glycol, or ethylene glycol in the amount of 2 percent by weight of the polymer. A firm gel formed in each instance.

EXAMPLE 17

N-vinyl-2-pyrrolidone was polymerized by preparing a 20 percent by weight aqueous solution, and admixing therewith, as a free-radical catalyst and 0.3 percent by weight divinyl benzene as a cross-linking agent. The resulting polymer was then admixed with furfuryl alcohol in an amount of 2 percent by weight of the polymer based on the weight of the alcohol. A firm gel was thus made.

EXAMPLE 18

To show the practice of the invention to make an explosive, an explosive composition was prepared employing the following materials in the amounts set out below.

| Ingredient: | Percent by wt. |
|---|---|
| Isopropyl alcohol | 4.7 |
| Tripropylene glycol | 14.1 |
| Flaked aluminum metal foil | 18.8 |
| Crushed ammonium nitrate prills [1] | 7.8 |
| Ammonium nitrate prills (uncrushed) | 7.8 |
| Crushed sodium nitrate prills [1] | 46.8 |

[1] Substantially all of a 12–40 mesh sieve size according to the U.S. Bureau of Standards Series.

The composition of the invention was prepared by first mixing the alcohol and glycol together and then admixing, with the resulting liquid mixture, sufficient poly-(N-vinyl-2-pyrrolidone), which had been prepared by subjection to irradiation, to provide 2.5 percent thereof based on the weight of the alcohol and glycol. To the resulting gelled liquid there were then admixed the sodium nitrate and ammonium nitrate and thereafter the flaked aluminum metal.

The composition so made was then ignited and evaluated in accordance with the testing procedure set forth in Underwater Explosives by Robert H. Cole (1948), published by Princeton University Press. The composition of the invention had excellent explosive properties, having good physical characteristics at tests carried out at as low as −30° C. It was water resistant and was particularly effective when tests after the gelled explosive composition had aged for from 6 to 24 hours.

The composition of the invention is a combustible, solid, particulate gel which is pumpable and lends itself readily to being efficiently used as a fuel wherever a gelled fuel is desirable. The poly-(N-vinyl-2-pyrrolidone) and alcohol in accordance with the practice of the invention may be admixed with liquid, granular, particulate, or moldable explosives of combustible materials to impart to them satisfactory properties and to permit their being pumped or otherwise forced into pipes, channels, and depressions and to be packed therein for subsequent denotation or combustion. The composition of the invention is useful at low temperatures where conventional explosives, e.g., those often employed in mine blasting, freeze to a substantially non-deformable and as well as difficultly detonatable compositions. The combustibility of the compositions composed of or containing the alcohol and polymerized N-vinyl-2-pyrrolidone in accordance with the invention is enhanced.

Having described our invention, what we claim and desire to protect by Letters Patent is:

1. A combustible gelled composition of low freezing point comprising between about 0.2 percent and about 10 percent by weight of a cross-linked polymer of N-vinyl-2-pyrrolidone and an hydroxy compound selected from the class consisting of mono-alcohols of from 1 to about 10 carbon atoms, glycols having the formula

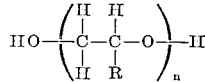

wherein $n$ is an integer of 1 to 5 and R is hydrogen or a methyl group, glycerol, glycol mono-alkyl ethers, wherein the alkyl group contains 1 to 2 carbon atoms, and polyoxyalkyleneglycols, wherein the alkylene group contains 2 to 3 carbon atoms and has a molecular weight of from about 200 to about 1000.

2. The combustible, gelled composition of low freezing point comprising the composition of claim 1 admixed with a particulated solid explosive material selected from the class consisting of nitrates of alkali metal, ammonium, and mixtures thereof and such nitrates admixed with readily oxidized particulate metal.

3. The composition of claim 2 wherein said readily oxidized particulated metal is aluminum.

4. The combustible, gelled composition of low freezing point comprising between about 0.3 and about 10.0 percent by weight of the polymer prepared by polymerizing N-vinyl-2-pyrrolidone with from 0.01 to 10.0 percent by weight of a cross-linking agent selected from the class consitsing of N,N′-methylenebisacrylamide, divinyl ether of diethylene glycol, divinylbenzene, sulfonated divinylbenzene and alkali metal salts of divinylbenzene, in the presence of a free-radical promoting catalyst selected from the class consisting of α,α′-azobisisobutyronitrile, benzoyl peroxide, hydrogen peroxide, and persulfates of alkali metals and ammonium and mixtures of persulfates and bisulfites of alkali metals and ammonium and balance to make 100% of an hydroxy compound selected from the class consisting of mono-, di-, and higher polyalcohols containing a total of between 1 and 10 carbon atoms per molecule, mono-alkyl ethers wherein the alkyl group contains 1 to 2 carbon atoms, and polyalkylene glycols wherein each alkylene group contains from 2 to 3 carbon atoms and has a molecular weight of not greater than about 1000.

5. The method of gelling an hydroxy compound selected from the class consisting of (1) mono-alcohols of from 1 to about 10 carbon atoms, (2) glycols having the formula

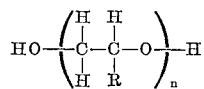

wherein $n$ is an integer of 1 to 5 and R is hydrogen or a methyl group, (3) glycerol, (4) glycol mono-alkyl ethers, wherein the alkylene group contains from 2 to 3 carbon atoms and has a molecular weight of from about 200 to about 1000, which consists of admixing therewith crosslinked N-vinyl-2-pyrrolidone in an amount of between about 0.2 percent and about 10 percent by weight of said hydroxy compound.

6. The method according to claim 5 wherein the N-vinyl-2-pyrrolidone is polymerized by subjecting it to ionizing irradiation.

References Cited by the Examiner
UNITED STATES PATENTS

| | | | |
|---|---|---|---|
| 3,035,948 | 5/1962 | Fox | 149—19 |
| 3,035,950 | 5/1962 | Long | 149—19 |
| 3,095,334 | 6/1963 | Scurlock | 149—19 X |
| 3,107,185 | 10/1963 | Hedrick et al. | 149—87 X |
| 3,113,894 | 12/1963 | Burton | 149—19 |

REUBEN EPSTEIN, *Primary Examiner.*

CARL D. QUARFORTH, *Examiner.*